US009547546B2

(12) United States Patent
Baumeister et al.

(10) Patent No.: US 9,547,546 B2
(45) Date of Patent: Jan. 17, 2017

(54) INTERRUPT SUPERVISION SYSTEM, PROCESSING SYSTEM AND METHOD FOR INTERRUPT SUPERVISION

(75) Inventors: Markus Baumeister, Munich (DE); Jeffrey L. Freeman, Austin, TX (US)

(73) Assignee: NXP USA, Inc., Austin, TX (US)

( * ) Notice: Subject to any disclaimer, the term of this patent is extended or adjusted under 35 U.S.C. 154(b) by 186 days.

(21) Appl. No.: 14/382,593

(22) PCT Filed: Mar. 12, 2012

(86) PCT No.: PCT/IB2012/051140
§ 371 (c)(1),
(2), (4) Date: Sep. 3, 2014

(87) PCT Pub. No.: WO2013/136114
PCT Pub. Date: Sep. 19, 2013

(65) Prior Publication Data
US 2015/0089305 A1 Mar. 26, 2015

(51) Int. Cl.
*G06F 11/00* (2006.01)
*G06F 11/07* (2006.01)
*G06F 13/24* (2006.01)

(52) U.S. Cl.
CPC ....... *G06F 11/0772* (2013.01); *G06F 11/0721* (2013.01); *G06F 11/0757* (2013.01); *G06F 13/24* (2013.01)

(58) Field of Classification Search
CPC .............. G06F 11/0772; G06F 11/0721; G06F 11/0757; G06F 13/24
(Continued)

(56) References Cited

U.S. PATENT DOCUMENTS 5,931,936 A * 8/1999 Chung ................. G06F 9/4812
710/263
7,752,675 B2 * 7/2010 Lee ........................ H04N 5/775
380/200

(Continued)

FOREIGN PATENT DOCUMENTS

EP 2111584 B1 8/2011

OTHER PUBLICATIONS

Dictionary definition of programmable interrupt controller, retrieved from wikipedia using the way back machine; retrieved from: https://web.archive.org/web/20111201222023/http://en.wikipedia.org/wiki/Programmable_Interrupt_Controller.*

(Continued)

*Primary Examiner* — Yair Leibovich

(57) ABSTRACT

An interrupt supervision system comprises an interrupt controller device comprising a plurality of interrupt request input lines and at least one output line connectable to a processing device. The interrupt controller device is arranged to receive, on the plurality of interrupt request input lines, a plurality of corresponding interrupt requests and to provide, on the at least one output line, the plurality of interrupt requests to the processing device in a sequence generated by the interrupt controller device depending on one or more priorities assigned to the interrupt requests; and one or more interrupt checker devices, each being arranged to receive a reception indication when the interrupt controller device receives, on a selected one of the plurality of interrupt request lines, a corresponding selected interrupt request, and to provide a corresponding error indication when an output of the corresponding selected interrupt request from the interrupt controller device on the at least one output line is not confirmed within a latency period assigned to the corresponding selected interrupt request,
(Continued)

wherein the assigned latency period begins when the interrupt checker device receives the reception indication.

20 Claims, 5 Drawing Sheets

(58) Field of Classification Search
USPC .......................................................... 714/51
See application file for complete search history.

(56) References Cited

U.S. PATENT DOCUMENTS

| | | |
|---|---|---|
| 7,865,758 B2 | 1/2011 | Swaney et al. |
| 7,934,036 B2 | 4/2011 | Conti et al. |
| 8,131,901 B2 * | 3/2012 | Mansell ................ G06F 9/4812 |
| | | 710/260 |
| 9,298,251 B2 * | 3/2016 | Lee ....................... G06F 1/3243 |
| 2006/0156075 A1 | 7/2006 | Mitsuishi |
| 2008/0022027 A1 | 1/2008 | Tsuboi |
| 2008/0126618 A1 | 5/2008 | Pardo |
| 2008/0313384 A1 * | 12/2008 | Angerbauer ........ G06F 9/30181 |
| | | 711/100 |
| 2010/0131801 A1 * | 5/2010 | Baleani ............... G06F 11/1641 |
| | | 714/37 |

OTHER PUBLICATIONS

International Search Report and Written Opinion correlating to PCT/IB2012/051140 dated Nov. 26, 2012.

* cited by examiner

INTERRUPT SUPERVISION SYSTEM, PROCESSING SYSTEM AND METHOD FOR INTERRUPT SUPERVISION

FIELD OF THE INVENTION

This invention relates to an interrupt supervision system, a processing system and a method for interrupt supervision.

BACKGROUND OF THE INVENTION

A processing system is a system for processing data and contains at least one processing device, e.g., a microprocessor, arranged to perform certain tasks, such as the execution of a sequence of instructions that may be provided, for example, as part of a computer program.

An interrupt is a signal indicating the need for attention from, or a change in execution by, a processor core. The interrupt may cause a processing device to switch its device context or save its state of execution and to execute an interrupt handler or interrupt service routine (ISR) associated with the interrupt. An interrupt may be triggered by an interrupt request (IRQ). Interrupt requests may be signals generated by programs or peripheral devices and sent to the processing device, for example, to request the processing device to perform a requested service while abandoning its current tasks for the period.

The interrupt requests are transmitted to the processing device via an interrupt controller connected to receive the issued interrupt requests on interrupt request lines, each line typically dedicated to signal a particular associated interrupt request. The interrupt controller receives the interrupt requests from a variety of different sources of interrupt requests, e.g. peripheral devices, internal modules, and other processing devices, and asserts or provides the interrupt request to the processing device on one or more lines connected to the processing device, taking into account priorities or priority levels or interrupt request levels (IRQL) assigned to the interrupt requests.

Temporary failure of an interrupt controller may, for example, cause IRQ errors, such as priority errors, spurious, constant, wrong, late or even lost IRQs which may result in malfunction of the processing system and may, for example, result in dangerous situations, for example when being used in a safety critical system. Detection of errors generated by an interrupt controller device may, for example, be performed by using duplicated or replicated interrupt controllers connected to the same interrupt request lines and comparing the outputs of the interrupt controllers. In multiprocessor systems containing multiple processing devices and an associated set of interrupt controllers, the interrupt controllers may use an error detection strategy wherein the interrupt controllers are used in combination to control their outputs.

SUMMARY OF THE INVENTION

The present invention provides an interrupt supervision system, a processing system and a method for interrupt supervision as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary, as illustrated, for the understanding and appreciation of the underlying concepts of the present invention and in order not to obfuscate or distract from the teachings of the present invention.

Figure 1:
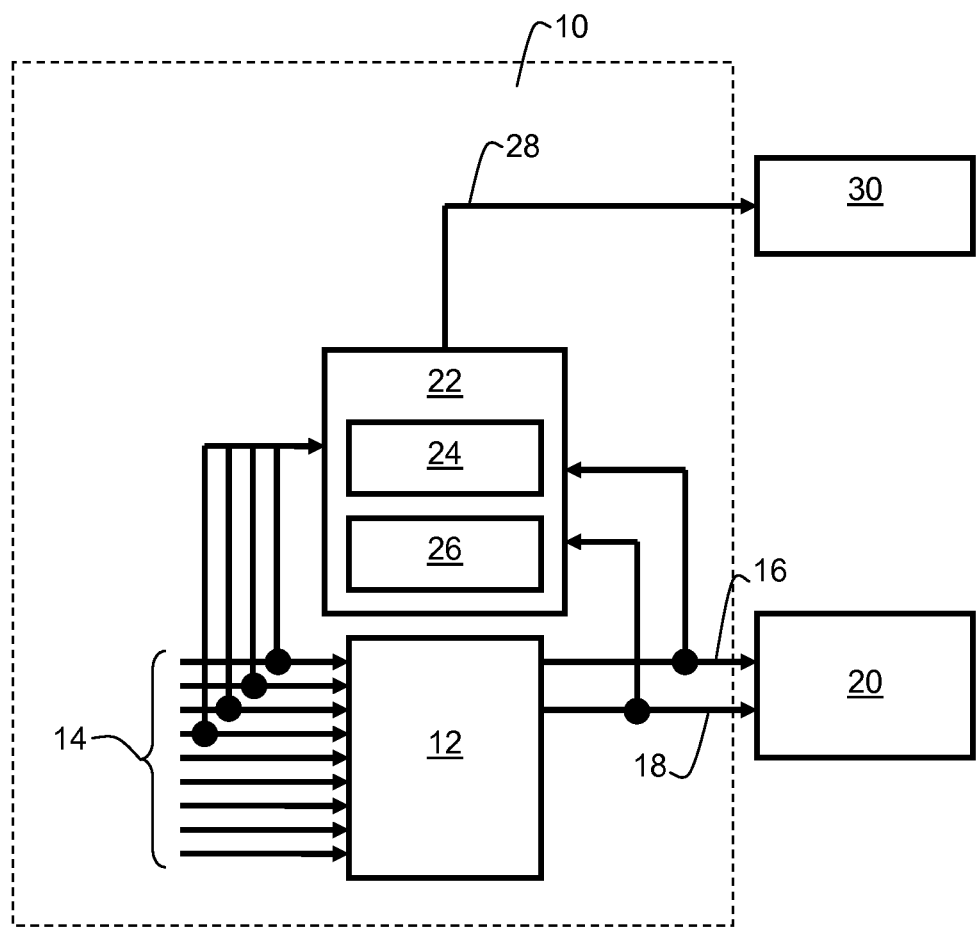
FIG. 1 schematically shows a block diagram of a first example of a first embodiment of an interrupt supervision system.

Referring to FIG. 1, the example of an interrupt supervision system 10 shown comprises a plurality of interrupt request input lines 14 and at least one output line 16, 18 connectable to a processing device 20. The multiple or plurality of interrupt request input lines 14 may, for example, be connected to different peripheral devices (not shown), such as, for example, data storage devices or data input or output devices of a processing system. An interrupt controller device 12 is connected to the interrupt request input lines 14 and to the interrupt request output lines 16,18. The interrupt controller device 12 is arranged to receive, on the plurality of interrupt request input lines 14, a plurality of corresponding interrupt requests and to provide, on the at least one output line 16, 18, the plurality of interrupt requests to the processing device 20 in a sequence generated by the interrupt controller device 12 depending on one or more priorities assigned to the interrupt requests.

The shown interrupt supervision system 10 comprises one or more interrupt checker devices 22, each being arranged to receive a reception indication when the interrupt controller device 12 receives, on a selected one of the plurality of interrupt request lines 14, a corresponding selected interrupt request, and to provide a corresponding error indication when an output of the corresponding selected interrupt request from the interrupt controller device 12 on the at least one output line is not confirmed within a latency period assigned to the corresponding selected interrupt request. The assigned latency period begins when the interrupt checker device 22 receives the reception indication.

The interrupt checker device 22 allows for interrupt supervision and error detection in an output of an interrupt controller device 12 without requiring replication of the interrupt controller device. It may, for example, be suitable for monitoring non-periodic or periodic, high-priority IRQs sent to a processing device 20, which may, for example, be a single core processing device, a multi-core processing device operating, at least some of the time in lock step, a direct memory access (DMA) controller getting triggered to execute a certain data transfer, or any other device reacting on an IRQ. Also, the interrupt checker device 22 may allow for interrupt supervision and error detection in systems with only a singular interrupt controller device 12, where no cross-checking of results between several interrupt control devices 12 is possible.

The interrupt controller device 12 may be arranged to signal interrupt requests to the processing device 20 on one or more output lines 16, 18. As shown in FIG. 1, the interrupt controller device 12 may be connected to the processing device 20 at least using a first 16 and a second output line 18. For example, the first output line 16 may signal an interrupt request and the second output line 18 may transmit a corresponding interrupt vector information, which may, for example, be a memory address of an interrupt handler to be executed by the processing device 20 after saving its execution state or an index into a jump table containing such a memory address. Confirming an output of the corresponding selected interrupt request from the interrupt controller device 12 on the first an second output lines 16, 18 may comprise confirming that on the first output line 16 an IRQ is indicated and confirming that on the second output line 18 a vector is transmitted and that the vector has the correct value corresponding to the selected IRQ.

The interrupt checker device 22 may, for example, be a small logic circuit, requiring only very few die area when implemented as an integrated circuit, for example, together with the interrupt controller device 12 or the processing device 20. The interrupt checker device 22 may for example be implemented as a small and simple supervision logic device arranged to monitor forwarding of a particular or selected one of the plurality of interrupt requests by the interrupt controller device 12 to the processing device 20, thereby enabling an increased reliability without significant increase in die size.

The interrupt checker device 22 may be connected to receive a selected interrupt request information, i.e., an information whether an interrupt request is received on one particular or selected of the plurality of interrupt request input lines 14. As shown in FIG. 1, the interrupt checker device 22 may be directly connected to at least the selected interrupt request line and the reception indication may be identical to the selected interrupt request itself. In another embodiment, the reception indication may be different from the selected interrupt request. It may, for example, be provided by the interrupt controller device 12 to the interrupt checker device 22 on a dedicated indication line asserted by the interrupt controller device 12 when receiving the selected interrupt request.

The interrupt checker device 22 may be arranged to receive a confirmation of an output of the corresponding selected interrupt request, i.e., the interrupt checker device 22 may receive a confirmation that the selected interrupt request (after being received on the selected one of the interrupt request input lines) has been output by the interrupt controller device 12 and transmitted to the processing device 20. The confirmation may be received directly, e.g. by monitoring the output of the interrupt controller device 12, or indirectly, e.g. by receiving from the processing device 20 an indication that the processing device 20 has finished execution of the interrupt handler triggered by the respective interrupt request. For example, in the embodiment shown in FIG. 1 the interrupt checker device 22 may be connected to the first and second interrupt request output lines 16, 18 and may directly receive the signals sent on the interrupt request output lines 16, 18 and may be arranged to detect the selected interrupt request for confirmation.

At least one of the one or more interrupt checker devices 22 may comprise one or more memory units 24, 26 arranged to store interrupt request selection information. A first memory unit 24 may, for example, be arranged to store an interrupt identifier, such as an interrupt number. A memory unit 24, 26 may, for example, be a register. The interrupt checker device 22 may be arranged to select one of the interrupt request input lines 14 corresponding to the stored interrupt identifier as the input line dedicated to the selected interrupt request. A second memory unit 26 may, for example, be arranged to store interrupt vector information corresponding to the interrupt identifier stored in the first memory unit 24.

The one or more memory units 24, 26 may store the interrupt selection information, for example, the interrupt number and corresponding vector address, in a permanent representation. Alternatively, memory unit 24 may be completely missing and only one of the IRQ input lines 14 may be connected to the interrupt checker device 22, implicitly selecting the IRQ to supervise. In another embodiment, the interrupt checker device 22 of the interrupt supervision system 10 may, for example, comprise a configuration interface for writing to or initializing at least the one or more memory units 24, 26. The interface may, for example, be a programming interface.

The interrupt checker device 22 may be connected to the corresponding selected interrupt request input line. As shown in FIG. 1, the interrupt checker device 22 may, for example, be connected to multiple of the plurality of interrupt request input lines 14, for example all interrupt request input lines. At least one of the one or more interrupt checker devices 22 may be connected through a connection to one or more of the plurality of interrupt request input lines and be arranged to activate the connection to the selected interrupt request input line depending on the interrupt request selection information. Since interrupt supervision may be especially important for high priority interrupts, the shown interrupt checker device 22 may be connected to a subset of the interrupt request input lines, which may comprise at least the interrupt request input line corresponding to the selected interrupt request. After an interrupt request has been configured as the selected one, only the connection to the corresponding interrupt request input line may be used for receiving the reception indication.

An interrupt checker device 22 may be used for monitoring each of the plurality of interrupt request input lines 14. Alternatively, only some lines may be monitored, for instance only high priority interrupt requests may be monitored. Thereby an interrupt supervision system 10 requiring only a small die area may be obtained. The interrupt checker device 22 may for example monitor only the highest priority interrupt request. Thereby, the need for a timer to measure latency may be obviated. In this respect, it should be noted that each interrupt request may have assigned a priority, and the latency period be related to the priority. For example, a high priority may correspond to a short latency period and vice versa, and the interrupt requests with the highest priority may be assigned the shortest latency.

The assigned latency may be a predetermined period of time or a varying period of time, e.g. lapsing between predetermined types of events, For instance when directly monitoring the output of the interrupt controller device 12, the latency period may refer to a maximum period of time allowed between receiving the reception indication by the interrupt checker device 12 and observing the selected interrupt request on the one or more output lines 16, 18.

For instance for the highest priority interrupt request, the assigned latency period may set to as the period between the point in time the interrupt checker device receives the reception indication until the first time that any interrupt request is outputted on the output line (or otherwise a confirmation obtained of an output of an interrupt request, whether or not the highest priority request, on the one or more output lines 16) after that reception. In such case, the duration of the latency can vary depending on the time interval between reception and the first time any interrupt request is outputted on the output line, and if this is the outputting of the highest priority request the end of the latency coincides with the confirmation. Thereby, outputting the highest priority request can be checked in a simple manner. For example, the next output interrupt request after receiving a highest priority interrupt request may be checked for correct IRQ and vector information and in case not found to be the most recently received highest priority interrupt, an error may have occurred.

The interrupt checker device 22 may be arranged to generate an error indication. The error indication may, for example, be provided on an error indication line 28. The error indication line 28 may, for example, be connectable to a fault management device 30 or to the processing device 20 and may be used for correction or changing a task execution by the processing device 20. Just to give an example, this may include causing the processing device 20 to enter a safe state or providing an error indication to a user of a processing system comprising the processing device 20.

Figure 2:
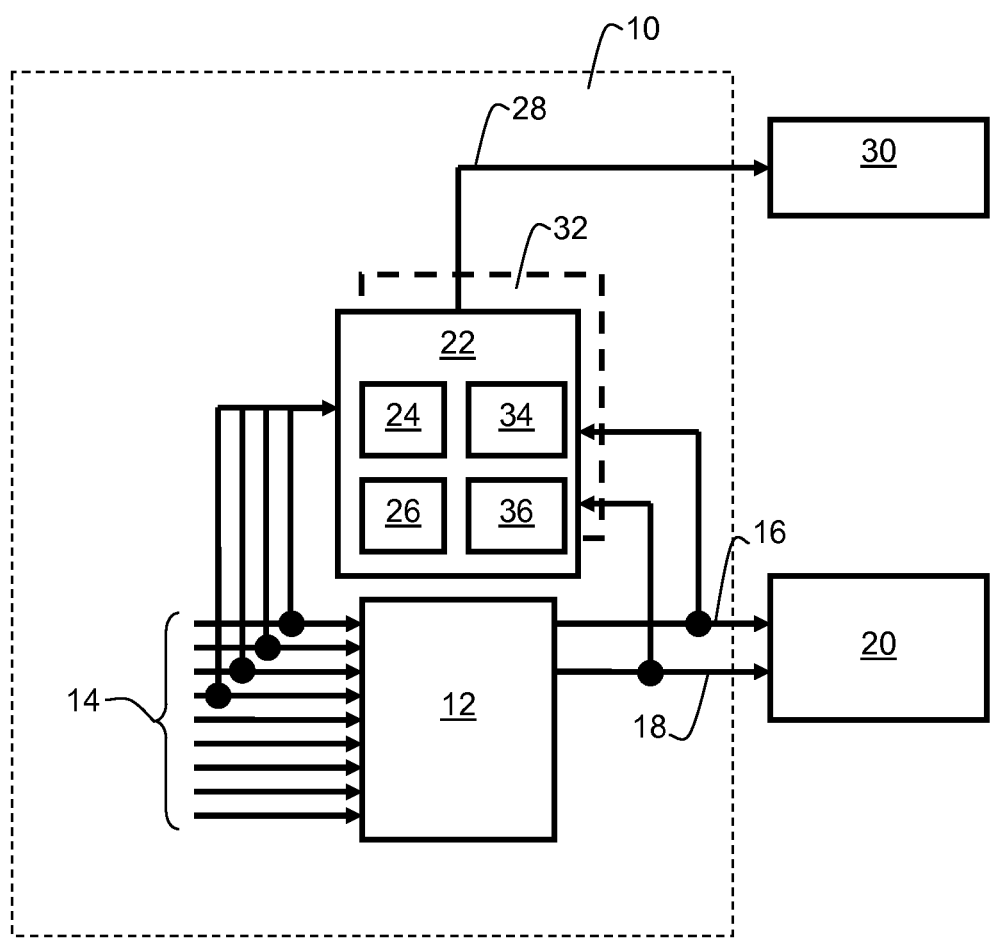
FIG. 2 schematically shows a block diagram of a second example of a second embodiment of an interrupt supervision system.

Referring to FIG. 2, a second example of an embodiment of an interrupt supervision system is schematically shown. Only elements different from those of the example shown in FIG. 1 and described in the above will be explained in detail. As shown, the interrupt supervision system 10 may comprise two or more interrupt checker devices, for example, a first interrupt checker device 22 and a second interrupt checker device 32. Each of the interrupt checker devices 22, 32 may be arranged to monitor a different selected interrupt request input line or lines. The first and second interrupt checker devices may, for example, share the same error indication line 28 or may each be connectable to the same or different fault management devices 30 via separate error indication lines 28.

At least on of the one or more interrupt checker devices 22, 32 may comprise a timer unit 34 arranged to measure the assigned latency period and may also comprise a third memory unit 36 for storing a latency value associated with the particular selected interrupt request. The third memory unit 36 may, for example, comprise a timer configuration register. The timer unit 34 may be arranged to measure a period of time between reception of the reception indication and reception of a confirmation of an output of the corresponding selected interrupt request on the one or more output lines 16, 18. The interrupt checker device 22, 32 may be arranged to compare the measured time until reception of confirmation with the latency value (which defines the assigned latency) stored in the third memory unit 36, and may generate the error indication if the measured period of time exceeds the stored latency value. This may allow to check other or more than the highest priority IRQ, as well as to check what the actual latencies are. The actual latencies may for example be used to redefine the assigned latencies as well as be used when debugging of tasks executed on processing systems comprising the interrupt supervision system 10.

As shown in FIG. 2, the confirmation that the selected interrupt request has been output and transmitted to the processing device 20 by the interrupt controller device 12, may be received directly, by monitoring the output of the interrupt controller device 12. At least one of the one or more interrupt checker devices 22, 32 may be connected to the at least one output line 16, 18 to monitor whether or not the corresponding selected interrupt request is outputted on the at least one output line 16, 18.

Figure 3:
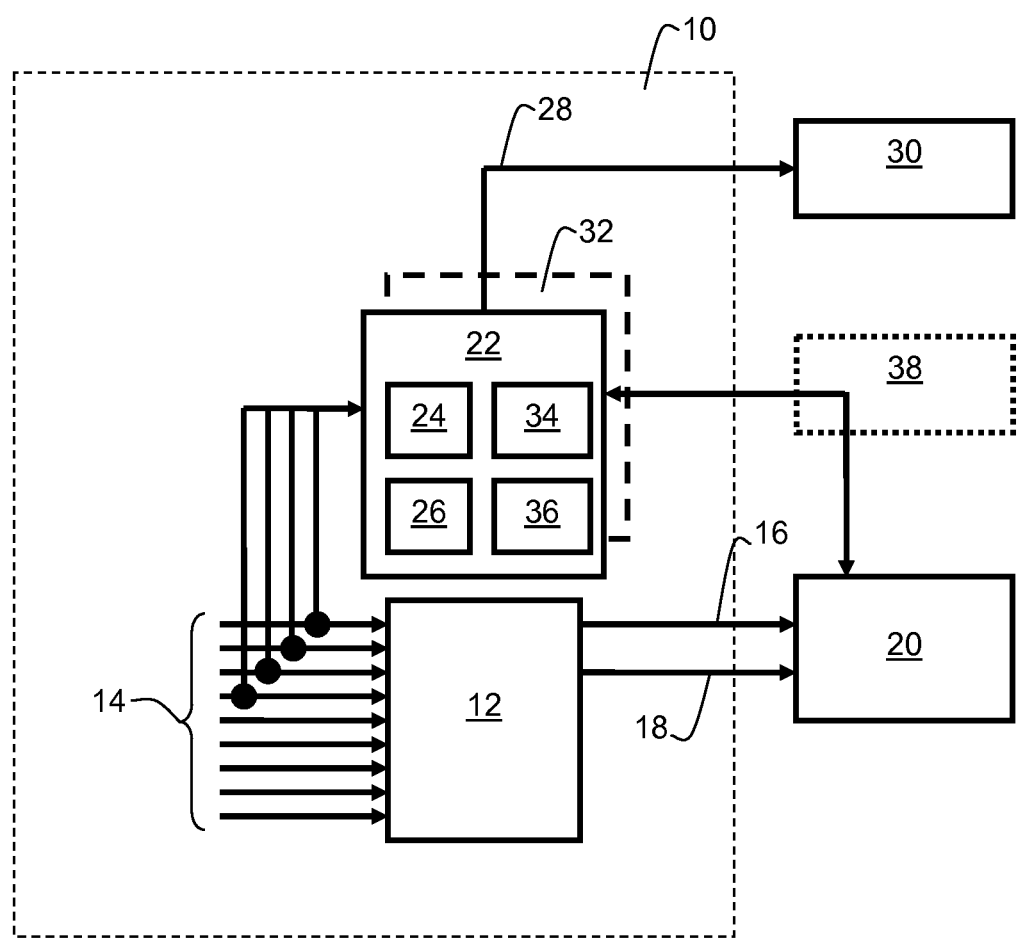
FIG. 3 schematically shows a block diagram of a third example of a third embodiment of an interrupt supervision system.

Referring to FIG. 3, a third example of an embodiment of an interrupt supervision system 10 is schematically shown. Only elements different from the examples of FIGS. 1 and 2 will be explained in detail. At least one of the one or more interrupt checker devices 22, 32 may be connected to the processing device 20, to receive from the processing device 20 an indication confirming completion of an interrupt service routine (ISR) associated with the corresponding selected interrupt service request. The interrupt checker device 22, 32 may receive the confirmation of an output of the corresponding selected interrupt request on the at least one output line 16, 18 indirectly by receiving an indication that the processing device 20 has finished execution of the interrupt handler or interrupt service routine triggered by reception of the selected interrupt request. The stored latency value may not refer to a maximum call latency but to a maximum execution latency comprising the time for calling and subsequently executing and finishing an ISR triggered by a selected IRQ. Confirmation of execution may include a confirmation of having received the selected IRQ and a confirmation of an output of the corresponding selected interrupt request on the at least one output line 16, 18.

At least one of the one or more interrupt checker devices 22, 32 may be connectable to the processing device 20 via a data bus 38 of a processing system. This may, for example, avoid a direct connection using connecting lines connected to the output lines 16, 18. Direct supervision of IRQ and vector output may be replaced by application of an IRQ software handler for reading the running timer 34, comparing the read value against a latency threshold and resetting the timer. If the latency threshold is exceeded, measures may be taken to handle the error. If the timer 34 runs longer than the configured maximum latency time stored in the third memory unit 36, e.g., 1 millisecond, an error indication may be generated, since the IRQ software handler may not have been called.

Figure 4:
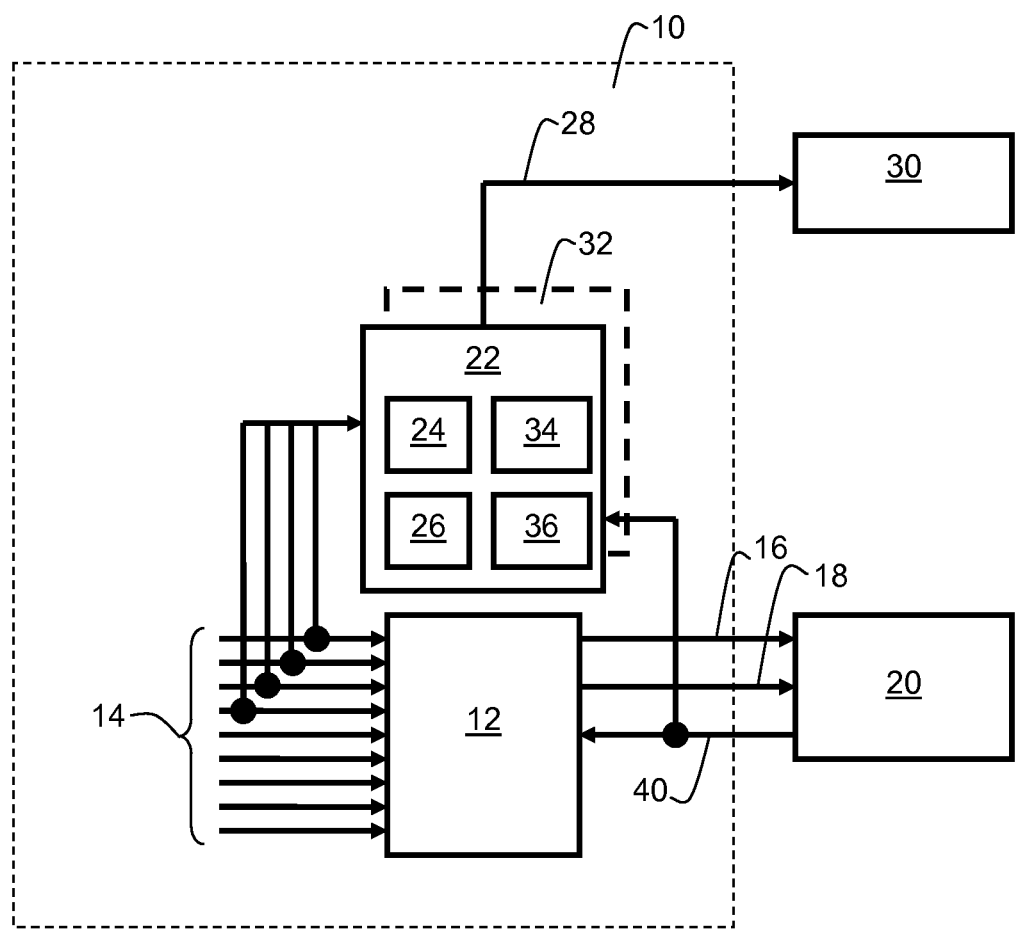
FIG. 4 schematically shows a block diagram of a fourth example of a fourth embodiment of an interrupt supervision system.

Referring to FIG. 4, a fourth example of an embodiment of an interrupt supervision system 10 is schematically shown. Only elements different from the second embodiment shown in FIG. 2 and the first embodiment shown in FIG. 1 will be explained in detail. The shown interrupt controller device 22, 32 may comprise at least one status input line 40 connectable to receive indications confirming completion of interrupt service routines corresponding to interrupt service requests sent to the processing device 20 on the at least one output line 16, 18 and wherein the at least one of the one or more interrupt checker devices 22, 32 may be connected to the at least one status input line 40. The interrupt checker device 22, 32 may receive the confirmation of an output of the selected interrupt request on the at least one output line 16, 18 through a connecting line that may be used by the processing device 20 for signalling, for example, an interrupt ready signal to the interrupt controller device 12. The signal transmitted on status input line 40 may, for example, refer to a received call or completed execution of the interrupt triggered by the selected interrupt request.

Figure 5:
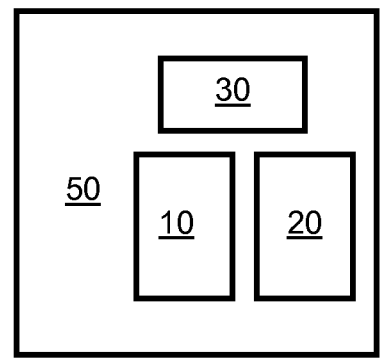
FIG. 5 schematically shows a block diagram of a fifth example of an embodiment of a processing system.

Referring to FIG. 5, an example of an embodiment of a processing system 50 is schematically shown. A processing system 50 may comprise a processing device 20 and an interrupt supervision system 10 as described above. The processing system 50 may, for example, also comprise a fault management device 30 or fault control and correction device connected to receive the error indication from the interrupt checker device of the interrupt supervision system 10.

The processing system 50 may, for example, be or comprise a microprocessor or microcontroller, and the processing device 20 may for example be a central processing unit (CPU) and/or a coprocessor and/or a digital signal processor and/or an embedded processor. The processing system 50 may also be or comprise a microcontroller (µC), such as a controller for an electronic stability control (ESC) system used to modulate braking and traction forces of a vehicle, such as a car or other safety critical system.

The processing system 50 may for instance include one, or more, processor cores which can execute the instructions in a memory connected to the processor core. The processor core may for instance include the logic circuitry required to execute program code in the form of machine code. The processor core may for instance at least include an instruction decoder, an arithmetic unit, an address generation unit, and a load/store unit. The microprocessor may for example include, in addition to the processor core, inputs/outputs or other components, such as and/or communication interfaces and/or coprocessors and/or analog-to-digital converters and/or clocks and reset generation units, voltage regulators, memory (such as for instance flash, EEPROM, RAM), error correction code logic and/or timers or other suitable components.

The processing device 50 may, for example, comprise a single core processing device connected to a single interrupt controller device, i.e. without multiple interrupt controller devices for checking each others interrupt request output to the processing device 20. The processing system 50 may, for example, comprise a lock-stepped core processing device as the processing device 20. A lock-stepped core processing device may comprise multiple processing cores operating in lock-step with respect to each other, but may be provided with a single interrupt controller device not aware of being connected to multiple processing cores instead of a single core processing device.

The processing system 50 may, for example, be a safety critical system or may be comprised in a safety critical system. A safety critical system may, for example, be an automotive safety critical system, where possible malfunction or wrong usage may endanger, for example, a user of the system, e.g. a car driver. A safety critical system may, for example, be part of electronic equipment of a power plant or a self-propelled vehicle, such as a car, truck, plane, ship, helicopter, etc. An automotive safety critical system, may, for example, comprise an engine control unit (ECU). An automotive safety critical system may, for example, be a car safety system. A safety critical system may comprise a seat position control system, lighting, airbags, windscreen wipers, immobilizers, electronic climate control, a brake system or an electrical steering system. A brake system may comprise, for example, an anti-lock braking system (ABS), an electronic brakeforce distribution system (EBD), a cornering brake control (CBC) system etc. An electrical steering system may comprise, for example, an electronic stability control system (ESC), a traction control system (TCS) or anti-slip regulation system (ASR), an adaptive cruise control (ACC) system, a forward collision warning (FCW) system etc.

Figure 6:
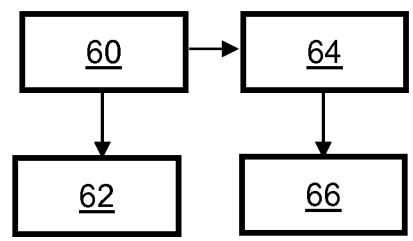
FIG. 6 schematically shows a flow-chart of an example of a method for interrupt supervision.

Referring to FIG. 6, a diagram of an example of an embodiment of a method for interrupt supervision is schematically shown. The method shown in FIG. 6 allows implementing the advantages and characteristics of the described interrupt supervision system as part of a method for interrupt supervision.

The shown method is a method for interrupt supervision in an interrupt supervision system comprising an interrupt controller device and one or more interrupt checker devices, wherein the interrupt controller device comprises a plurality of interrupt request input lines and at least one output line connectable to a processing device. The method comprises receiving 60, on the plurality of interrupt request input lines, a plurality of corresponding interrupt requests; providing 62, on the at least one output line, the plurality of interrupt requests to the processing device in a sequence generated by the interrupt controller device depending on one or more priorities assigned to the interrupt requests; receiving 64, by the one or more interrupt checker devices, a reception indication when the interrupt controller device receives, on a selected one of the plurality of interrupt request lines, a corresponding selected interrupt request, and providing 66, by the one or more interrupt checker devices, a corresponding error indication when an output of the corresponding selected interrupt request from the interrupt controller device on the at least one output line is not confirmed within a latency period assigned to the corresponding selected interrupt request, wherein the assigned latency period begins when the interrupt checker device receives the reception indication.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connections that transfers multiple signals serially or in a time multiplexed manner. Likewise, single connections carrying multiple signals may be separated out into various different connections carrying subsets of these signals. Therefore, many options exist for transferring signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the interrupt controller device 12 and the interrupt checker device 22, 32 may be implemented as a single device.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. For example, the processing system 50 may be as a single integrated circuit, and e.g. be implemented as a system-on-a-chip or a system in a package, which may, for example, be a microcontroller unit (MCU). Alternatively, the example may be implemented as any number of separate integrated circuits or separate devices interconnected with each other in a suitable manner. For example, the interrupt supervision system 10 and the processing device 20 may be implemented as separate integrated circuits connected to each other in a suitable manner, e.g. through a printed circuit board.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. An interrupt supervision system, comprising:
a plurality of interrupt request input lines;
an interrupt request output line;
an interrupt controller device connected to said interrupt request input lines, for receiving, on said plurality of interrupt request input lines, a plurality of interrupt requests, said interrupt controller device being arranged to generate a sequence of interrupt requests from said plurality of interrupt requests depending on one or more priorities assigned to said interrupt requests and to output said plurality of interrupt requests in said sequence on said interrupt request output line;
said interrupt supervision system further comprising an interrupt checker device connected to a selected one of said interrupt request input lines, to detect that said interrupt controller device has received on said selected interrupt request input line a selected interrupt request, and connected to said interrupt request output line;
said interrupt checker device being arranged to provide an error indication when an output of said selected interrupt request on said interrupt request output line has not been confirmed within a latency period assigned to said selected interrupt request, said latency period beginning when said interrupt checker device detects that said interrupt controller device has received said selected interrupt request.

2. The interrupt supervision system as claimed in claim 1, comprising a memory unit arranged to store interrupt request selection information for the interrupt checker device.

3. The interrupt supervision system as claimed in claim 2, comprising a connection between said interrupt checker device and said plurality of interrupt request input lines which can be activated or deactivated, and said interrupt checker device is arranged to activate or deactivate said connection depending on said interrupt request selection information.

4. The interrupt supervision system as claimed in claim 1, wherein for said interrupt checker device said assigned latency period ends with a first occurrence subsequent to receiving said selected interrupt request of outputting of an interrupt request on said interrupt request output line.

5. The interrupt supervision system as claimed in claim 1, wherein said interrupt checker device comprises a timer unit arranged to measure said assigned latency period.

6. The interrupt supervision system as claimed in claim 1, wherein said interrupt checker device is arranged to monitor the output of the interrupt controller device and said confirmation is received when the interrupt checker observes an output of said corresponding selected interrupt request on said interrupt request output line.

7. The interrupt supervision system as claimed in claim 1, wherein said interrupt checker device is connectable to said processing device and arranged to receive from said processing device an indication confirming completion of an interrupt service routine associated with said corresponding selected interrupt service request.

8. The interrupt supervision system as claimed in claim 7, wherein said interrupt checker device is connectable to said processing device via a data bus of a processing system.

9. The interrupt supervision system as claimed in claim 7, wherein said interrupt controller device comprises a status input line connectable to receive indications confirming completion of interrupt service routines corresponding to interrupt service requests sent to said processing device on said interrupt request output line and wherein said interrupt checker device is connected to said status input line.

10. A processing system, comprising
a processing device; and
an interrupt supervision system coupled to the processing device, the interrupt supervision system comprising:
a plurality of interrupt request input lines;
an interrupt request output line;
an interrupt controller device connected to said interrupt request input lines, the interrupt controller to receive a plurality of interrupt requests on said plurality of interrupt request input lines, to generate a sequence of interrupt requests in response to said plurality of interrupt requests and priorities assigned to said interrupt requests, and to output said plurality of interrupt requests in said sequence on said interrupt request output line; and
an interrupt checker device connected to the interrupt request input lines and to said interrupt request output line, to detect that said interrupt controller device has received a selected interrupt request on said selected interrupt request input line, to provide an error indication in response to an output of said selected interrupt request on said interrupt request output line has not been confirmed within a latency period assigned to said selected interrupt request, wherein the latency period is assigned to the selected interrupt request based on the priority of the selected interrupt request, said latency period beginning when said interrupt checker device detects that said interrupt controller device has received said selected interrupt request.

11. The processing system as claimed in claim 10, comprising a fault management device connected to said interrupt supervision system, to receive said error indication from said interrupt supervision system.

12. The processing system as claimed in claim 10, wherein said processing device comprises two processing cores operable in lock-step mode.

13. The processing system as claimed in claim 10, implemented as a single integrated circuit, such as a system-on-a-chip or a system in a package.

14. The processing system as claimed in claim 10, wherein said processing system is a safety critical system.

15. The processing system of claim 10, wherein said interrupt checker device comprises a timer unit arranged to measure said assigned latency period.

16. A method for interrupt supervision in an interrupt supervision system, said method comprising:
receiving, by an interrupt controller device, over a plurality of interrupt request input lines a plurality of interrupt requests;
generating, by said interrupt controller device, a sequence of interrupt requests from said plurality of interrupt requests depending on priorities assigned to said interrupt requests;
outputting, by said interrupt controller device, on a output line said plurality of interrupt requests to a processing device in said sequence;
detecting, by a interrupt checker device, that said interrupt controller device has received, on a selected one of said plurality of interrupt request lines, a selected interrupt request; and
providing, by said interrupt checker device, an error indication when an output of said selected interrupt request from said interrupt controller device on said interrupt request output line is not confirmed within a latency period assigned to said selected interrupt request, wherein said assigned latency period begins when said interrupt checker device detects that said interrupt controller device has received the selected interrupt request.

17. The method of claim 16, further comprising:
measuring, at a timer unit of the interrupt checker device, the assigned latency period.

18. The method of claim 16, further comprising:
storing, at a memory unit, interrupt request selection information for the interrupt checker device.

19. The method of claim 17, further comprising:
activating or deactivating, a connection between said interrupt checker device and said plurality of interrupt request input lines, depending on said interrupt request selection information.

20. The method of claim 16, wherein for said interrupt checker device said assigned latency period ends with a first occurrence subsequent to receiving said selected interrupt request of outputting of an interrupt request on said interrupt request output line.

* * * * *